United States Patent [19]
Faisant

[11] Patent Number: 5,890,577
[45] Date of Patent: Apr. 6, 1999

[54] LOAD SEPARATOR FOR A DYNAMIC STORAGE LANE

[75] Inventor: Gilles Faisant, Château-d'Olonne, France

[73] Assignee: Sipa-Roller, Mouilleron-Le-Captif, France

[21] Appl. No.: 875,395

[22] PCT Filed: Jan. 3, 1996

[86] PCT No.: PCT/FR96/00008

§ 371 Date: Sep. 23, 1997

§ 102(e) Date: Sep. 23, 1997

[87] PCT Pub. No.: WO96/23714

PCT Pub. Date: Aug. 8, 1996

[30] Foreign Application Priority Data

Jan. 30, 1995 [FR] France ................................... 95 01195

[51] Int. Cl.⁶ .......................... B65G 13/075; B65G 47/34
[52] U.S. Cl. .................. 193/35 A; 198/459.6; 198/463.4
[58] Field of Search ....................... 193/35 A; 198/459.6, 198/463.4, 463.5, 459.5

[56] References Cited

U.S. PATENT DOCUMENTS 5,213,189  5/1993  Agnoff .................................. 193/35 A

FOREIGN PATENT DOCUMENTS

| 2639331 | 5/1990 | France . |
|---|---|---|
| 7534405 | 3/1977 | Germany . |
| 9404684 | 5/1994 | Germany . |
| 1009128 | 11/1965 | United Kingdom . |

*Primary Examiner*—Joseph E. Valenza
*Assistant Examiner*—Mark Deuble
*Attorney, Agent, or Firm*—Greenblum & Bernstein, P.L.C.

[57] ABSTRACT

Pallet separator including a pedal located at a downstream end of a storage chute. The pedal is connected via a tie to a stop such that movement of the pedal by a load causes movement of the stop which retains and separates loads arranged upstream of the load acting upon the pedal. The pallet separator also includes a delay device in the form of a controlled leak jack whose rod stroke extends from a delay start position and a delay end position. The jack is capable of maintaining the stop in an active position for sufficient time to allow removal and handling of the downstream load before arrival of the next load at the end of the chute.

20 Claims, 3 Drawing Sheets

LOAD SEPARATOR FOR A DYNAMIC STORAGE LANE

BACKGROUND OF THE INVENTION

1. Field of the Invention

This invention relates to the general field of dynamic storage of pallet-type loads, for instance; it relates more particularly to a safety system for the load separation devices in dynamic storage chutes.

2. Discussion of Background

The dynamic storage facilities are made up of chutes fitted with rollers or cylinders mounted parallel to one another on beams forming a frame which is tilted from its upstream to its downstream section. These rollers and/or cylinders determine a raceway on which the loads, generally handling pallets, are placed.

In order to suppress the problems associated with the extraction of the loads located at the lower portion of the storage chute, and notably that of the pressure exerted onto the end load by the accumulation of the upstream loads, a load separation device is commonly used at the level of the downstream end of the chute. This device is suited to isolate at least the first load, located downstream on the facility, with respect to the other loads which are waiting, upstream, in order to allow smooth extraction of this first load, without causing any problems, using for instance a fork-lift.

These separation devices are constituted of a pedal and of a stop, interconnected by a pole- or a tie-shaped linking rod. The pedal has been accommodated at the end of the chute and is designed to be actuated by the downstream load; the stop is used to retain the upstream load(s) in order to separate them from the load located at the downstream end. This stop is brought into active retaining position by the pedal when the latter is actuated by the end downstream load and it is de-actuated when the said downstream load is removed, in order to let the following load take its place at the end of the chute and actuate, in turn, the pedal as well as the retaining stop for the other loads.

Moreover, to provide greater safety when handling the load removed downstream of the chute, it proves interesting to retain the upstream load(s), to give some time to the operator to remove the downstream load without being affected by the pressure of the other loads on the chute. In this view, the load separation devices are usually fitted with means enabling to prevent too soon a release of the stop when removing the downstream load.

The documents FR-2 639 331 and DE-GM 7 534 405 describe two separation devices. In both these facilities, the end pedal controls the retaining stop directly, via a tie rod or a pole. The retaining stop is rotatably mounted on an articulation axis and it is subject to balancing means round the said axis which tend, by themselves, to bring the pedal back into raised position and to put the said stop in inactive position. These balancing means enable handling the separation device with minimum encumbrance; the end pedal can be actuated by any type of load, even by very light loads.

The separator according to the document FR-2 639 33 1 follows a principle in which the control of the stop is delayed by a particular interconnection between the handling pedal and the pulling rod. In such a case, the beginning of the motion of the pedal, linked to the extraction of the end load, has little influence on the motion of the stop; when the pedal reaches the end of its stroke, its motion is transmitted integrally to the said stop, until the latter is de-actuated.

With this separation device, the retaining stop is automatically de-actuated as soon as there is no contact between the pedal and the end load any longer. In spite of the provisions adopted to delay this de-actuation, the construction features of these gearworks cause quite a rapid release of the stop.

In the document DE-GM 7 534 405, the arrival of a load at the end of the chute actuates the retaining stop located upstream, but also a system to lock the pedal in lower position. The end load can be removed and handled without modifying the position of the separation device and hence without de-actuating the retaining stop. This de-actuation is carried out by a positive manoeuvre, manually or otherwise, on the locking means mentioned previously, when the operator wishes to move a load forward.

Other types of installations, operating according to different principles, are also known.

The document GB-1 009 128 describes a dynamic storage chute for pallets, fitted with a load separation device, consisting of an end pedal controlling a retaining stop via a pulling rod. This rod comprises two spaced shoulders serving, the former, to actuate the retaining stop via a toggle joint which, moreover, locks the said stop in active position and the latter, to de-actuate the said retaining stop. The second shoulder is suited to control the retaining stop just when the end pedal comes away from the pedal. This feature enables to delay the release of the loads stored upstream; the operator has therefore slightly more time to handle the load being picked-up.

As for the purposes of the document FR-2 639 331, the retaining stop is automatically de-actuated as soon as contact is lost between the end load and the pedal, which causes quite a fast release of the stop. On the other hand, a toggle joint is interposed between the end pedal and the retaining stop; unlocking the said toggle joint calls for a sizeable energy, which is provided by a spring-loaded accumulator. The energy in question is derived by the accumulator from the loads in motion, which actuate the end pedal, which limits the multi-purpose nature of the installation in terms of load weights. Indeed, according to their speeds and to their weights, the smaller loads may not possess sufficient kinetic energy to lower the end pedal combined to an energy accumulator.

This safety device is not optimum whatever the load conveyed and hence, it is not universally applicable.

The document U.S. Pat. No. 5,213,189 presents a load separation device constituted, as in the patent GB-1 009 128, of a pedal connected to the retaining stop by a rod associated with a locking toggle joint. The pedal is located at the downstream end of the chute and it is interconnected to a delay member which controls the release of the stop.

The delay member is constituted of a leak controlled-type jack, whose rod is interconnected to the end pedal. When the pedal is actuated by a load, causing the retaining stop to adopt an active position and the toggle joint to be locked, the said pedal compresses a spring-loaded accumulator and brings the jack's plunger back into a position corresponding, emblematically depicted, to the resetting of a delay member.

When the operator removes the load at the downstream end of the chute, the pedal rises slowly, regardless of the manoeuvring of the downstream load, but in relation to the leak of the delay jack, i.e. in relation to the motion of the jack's plunger.

On reaching a time-out pre-set in relation to the jack's leak rate, the rod connecting the pedal to the stop releases the toggle joint, which causes the loads retained by the said stop to be released, enabling the former to move forward on the chute. The first of these loads will now stand on the pedal in order, again, to raise the retaining stop which normally confines the upstream loads. The loads moving on the chute are conveyed, in the lower section of the chute, at different speeds to allow this separation to take place. The speed-controlled load separation means are not part of this invention.

In this embodiment, the energy necessary to unlocking the toggle joint is derived from the kinetic energy of the mobile loads reaching the end of the chute. In the case of loads with smaller weights, the kinetic energy may prove insufficient to actuate the pedal, raise the retaining stop and switch the spring(s) forming the accumulator system on; there again, the separation device in question is not universally applicable.

SUMMARY OF THE INVENTION

The invention suggests to render the pallet or load separators safer and universally applicable, i.e. they should operate whatever the loads present on the storage chute.

The subject matter of this invention is thus a pallet or load separator for dynamic storage chute, comprising, a pedal located at the downstream end of the said chute. This pedal is mobile under the effect of a load to control directly, via a tie rod and with minimum encumbrance, a load retaining and separation stop, arranged upstream of that acting onto the said pedal.

According to the invention, this separator comprises a delay member, in the form of a controlled leak jack, whose rod's stroke extends from a delay start position and a delay end position. This jack is suited to maintain the retaining stop in active position for a sufficient time to ensure removing and handling of the downstream load, without worrying about the arrival of the next load at the end of the chute.

The delay jack slows down or dampens the de-actuation motion of the stop. This slowing down or dampening effect varies according to the leak setting; it can be adapted to ensure de-actuation delay ranging from 5 seconds to 3 minutes after removing the end load.

According to a preferred embodiment, the separation device comprises a delay jack whose rod moves automatically from the delay end position to the delay start position, via means inherent to the said jack, such as spring-loaded means.

According to another embodiment, the dampening jack is a hydraulic jack, constituted of a cylindrical body enclosing a plunger with which a rod is interconnected, protruding outside the said body. The plunger/rod assembly is associated with a recall spring tending to bring the said rod into extracted position and whereas the plunger is slidably mounted in the cylindrical body, with a slight clearance to ensure peripheral oil leak, in relation to the requested dampening effect.

Preferably, the plunger separating the jack body into two chambers exhibits at least one traversing orifice associated with a selective blanking valve. This valve is adapted to blank off the said orifice(s) when the plunger plays its part as a delay member and it is adapted to ensure the opening of the said orifice(s) during reverse motion, back into stable position.

According to another embodiment, the jack's rod extends outside the cylindrical body via an orifice around which an oil collector has been arranged. This collector is designed for the collection of leaks or losses associated with the penetration of the rod in the cylindrical body.

On the other hand and according to an additional advantageous feature, the jack's body comprises an inner portion of larger diameter at the level of its end corresponding to the end of the stroke of the delay plunger. This feature increases the clearance between the cylindrical body and the plunger with a view to suppressing or limiting the dampening effect of the said plunger. Such a lay-out enables to delete suddenly the stop at the delay time-out, in order to prevent it from snapping onto or rubbing the inner surface of the load whose displacement is thus initiated.

According to an interesting embodiment, the delay jack can be arranged directly under the retaining stop, bearing against the chute's frame.

Still, according to a preferred embodiment, the separator device according to the invention comprises a retaining stop rotatably mounted on an articulation axis and subject to balancing means round the said axis which tend, by themselves, to bring the pedal back into raised position and to set the said stop into inactive position. These balancing means are constituted of a manoeuvring arm prolonging the retaining stop. This manoeuvring arm is subject to the permanent action of a balancing spring tending to de-actuate the stop and it is actuated, in actuation direction of the stop only, by a tie rod controlled by the end pedal.

According to another feature of the invention, the separator comprises a sub-assembly for locking the stop in its active position for retaining loads. The locking system properly speaking is implemented by a lever situated upstream of the end pedal at a distance from the latter smaller than the length of the loads. This lever comprises a section protruding above the circulation plane of the loads, retractable at the passage of a load and causing, on the one hand, a spring-loaded accumulator member to be pre-loaded, whose role consists in implementing the locking means of the retaining stop when it is set into active position by the end pedal and, on the other hand, the loading of a second accumulator member, also spring-loaded, whose role consists in unlocking the said stop and to bring the lever back to its home position.

According to a preferred embodiment, the locking system is constituted of a toggle joint comprising two rocker bars interposed between the chute's frame and the retaining stop. The chute's rocker bar contains a lug-shaped extension extending beneath the articulation of the frame's rocker bar. This lug serves as a guide at the end of a rod on which is arranged the implementation spring of the said toggle joint; this rod is recalled by the unlocking spring anchored on the frame.

According to another provision of the invention, a delay jack is interposed between the chute's frame and the control lever of the retaining stop's locking means. This jack is placed in order to delay the unlocking of the retaining stop; it can be associated with a second delay jack, arranged directly under the stop and enabling to soften the unlocking motion.

The separator device complying with this invention enables absolute safe dynamic storage of loads whose weights range from 50 kg and 1 ton.

BRIEF DESCRIPTION OF THE DRAWINGS

But the invention will be illustrated, without being limited to, the following description of two particular embodiments, given for exemplification purposes and represented on the appended drawings on which.

DETAILED DESCRIPTION

Figure 1A:
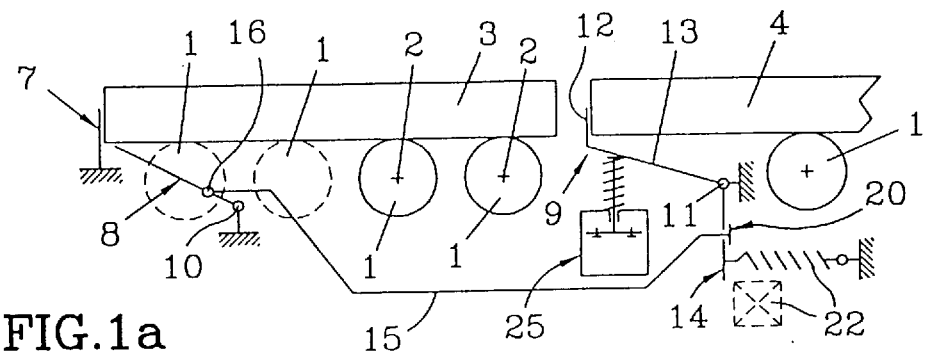
FIGS. 1a, 1b, 1c and 1d are diagrammatic representations of a possible embodiment of the safety device according to the invention, illustrating different operating phases.
Figure 1B:
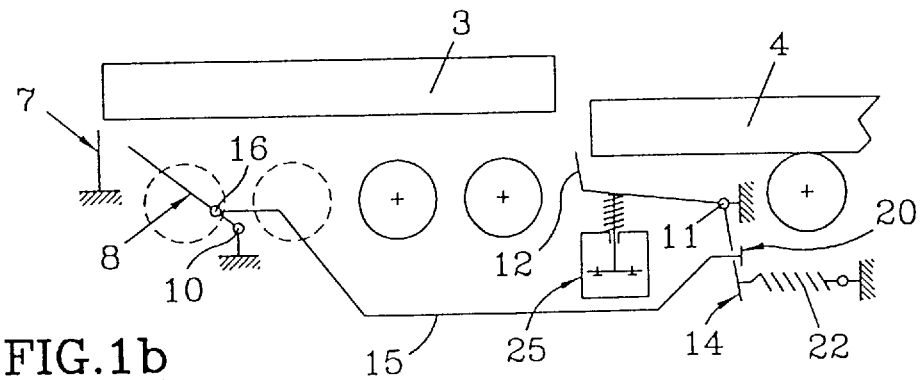

As represented on FIGS. 1a to 1d, the dynamic storage chute is constituted of a juxtaposition of cylinders 1 mounted to rotate freely on a horizontal axis 2. The cylinders 1 determine a raceway with a slight slope upstream towards downstream for the conveying and the storing of loads 3, 4, 5 such as pallets or boxes.

At the lower end of the storage chute, we notice the presence of a stop 7 designed for retaining the load furthermost downstream.

The end of the dynamic storage chute is also fitted with a device enabling to separate the furthermost downstream load from the other loads. This device enables extraction of this end load without being disturbed by the thrust exerted by the other loads.

This separator device is constituted of a pedal 8 arranged at the end of the chute and of a mobile stop 9 adapted to retain the second load as well as the following loads, by bearing upon the said.

The retaining stop 9 is arranged at a distance from the end stop 7 greater than the length of a load.

The pedal 8 is articulated round a rotational axis 10; it is actuated by the downstream load. The retaining stop 9 is articulated round a rotational axis 11; it has the shape of an end hook 12 connected to the said axis 11 via a tray 13. Beyond the axis 11, the stop 9 is prolonged by a manoeuvring arm 14 subject to actuation means and to de-actuation means.

The actuation means of the stop 9 are constituted of a traction rod or tie 15 controlled by the end pedal 8. This tie 15 is articulated in 16 on the pedal 8; its upstream end traverses freely the arm 14 and co-operates in traction with the latter via a stop 20 which has, preferably, the shape of an adjustable screw. Thus, the pedal 8 has a direct effect on the stop 9, via the tie 15 and the arm 14.

In view of the above and from a review of FIGS. 1a to 1d (as well as FIGS. 3a to 3d discussed below), the connections between the pedal 8 and the stop 9 involve articulated joints and the connection between the end of the tie 15 whose upstream end traverses freely in the arm 14 and cooperates in traction with the arm 14 via stop 20. Accordingly, the connection between the pedal 8 and the retaining stop 9, via tie 15, is substantially nonelastic.

The de-actuation means of the retaining stop 9 consist of a counterweight or of a balancing spring 22 acting permanently on the manoeuvring arm 14, in reverse direction of the traction effect exerted by the rod 15 and its end stop 20. FIG. 1a represents the balancing spring option 22 as a straight line and the counterweight option as a dotted line.

Such a separation device is more or less balanced round the articulation axis 11 in order to tend to bring the pedal 8 back into raised position and the stop 9 into inactive position. This device enables to set the stop 9 into active retaining position by the action of the end pedal 8, when the latter is controlled by the downstream load. Thanks to the balancing effect, this manoeuvre is performed with minimum encumbrance. Thus, even very light loads have sufficient kinetic energy to implement the separation device, which confers almost a general purpose character to the storage chute so fitted.

The stop 9 is de-actuated when removing the downstream load to let the following load take its place at the end of the chute. This load then actuates itself the retaining stop 9 via the pedal 8 and the traction rod 15 in order to retain the other loads. Such a separator device provides the operator with some time to remove the end load before the arrival of the following load.

In order to increase the safety of such a manoeuvre, the separation device according to the invention is fitted with means enabling to control the de-actuation motion of the retaining stop 9. These control means take the shape of a delay member 25 which allows to retain the stop 9 in active position, beyond the moment when the downstream load ceases to be in contact with the end pedal 8. This delay, before de-actuation, is set to provide the operator with sufficient time, in relation to the installation and to the type of loads, to ensure removing and handling the downstream load, without worrying about the arrival of the next load at the end of the chute.

Figure 2:
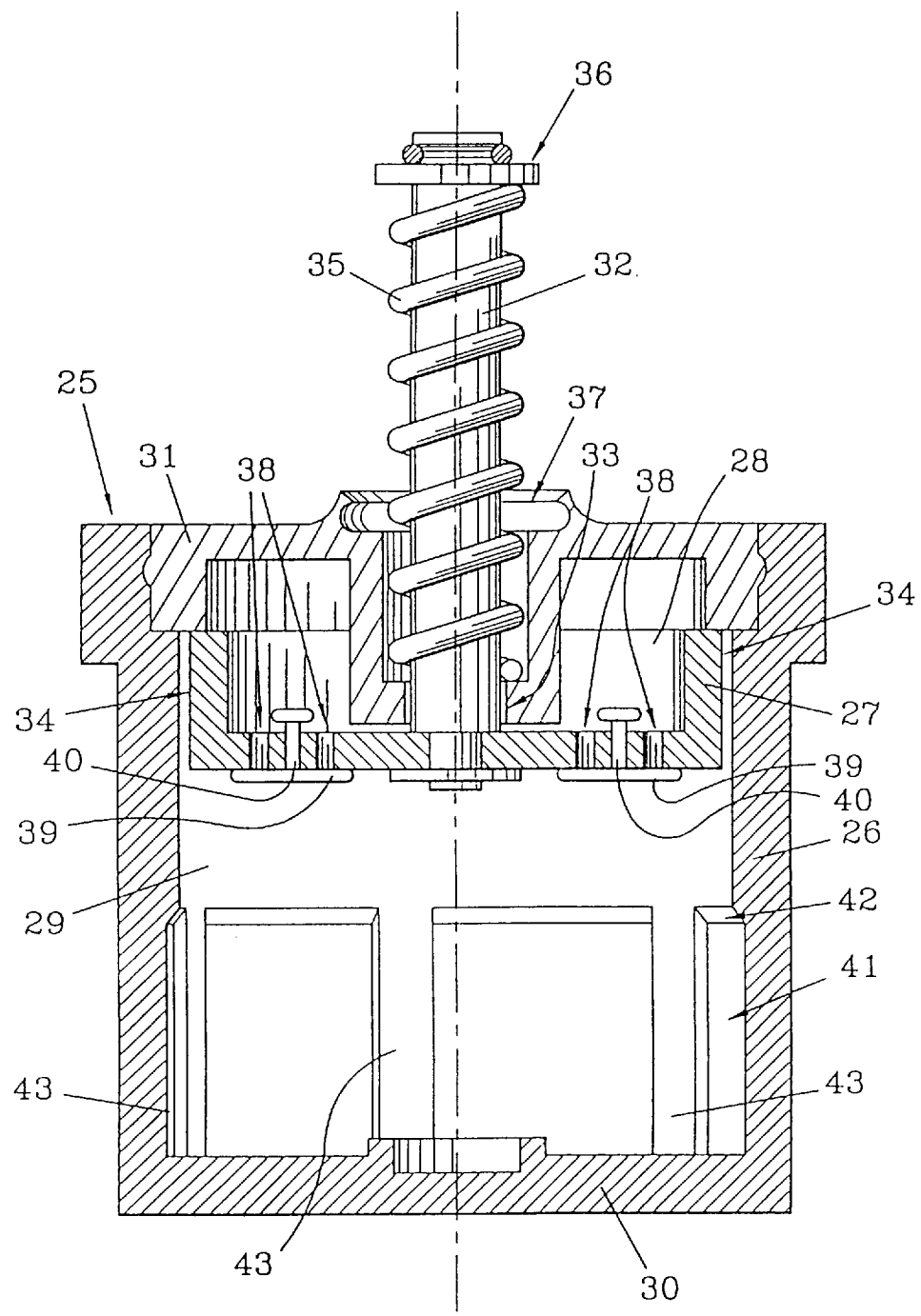
FIG. 2 is a cross sectional view of the leak-type jack used as a delay member.

This delay member 25 consists of a leak-type hydraulic jack, arranged under the stop 9 and which is detailed on FIG. 2.

This leak-type jack 25 is constituted of a cylindrical body 26 enclosing a mobile plunger 27 which separates the said cylindrical body 26 into two chambers 28 and 29 filled or partially filled with oil. The cylindrical body 26 is arranged vertically; it is blanked off, at its base, by a bottom 30 and in its upper part, by an attached lid 31. The plunger 27 carries the jack's rod 32 which is centred on the axis of the cylindrical body 26. This rod 32 extends, protruding outside the cylindrical body 26, via an axial orifice 33 cut-out in the lid 31.

The plunger 27 has the possibility of sliding axially in the cylindrical body 26; it is adjusted in the inner bore of the cylindrical body 26 with a slight clearance 34 which enables slight peripheral oil leak, from one chamber into another.

The axial rod 32 and the plunger 27 are subject to a helicoidal spring 35 arranged outside the body of the jack 26. This spring 35 is placed round the rod 32; it bears, on one side, on a stop 36 arranged at the external end of the rod 32 and, on the other side, against the lid 31, on the rim of the axial orifice 33.

The helicoidal spring 35 constitutes an inherent means tending to set the rod 32 in extracted position and to bring the plunger 27 back into the upper part of the cylindrical body 26.

On the lid 31, round the axial orifice 33, we notice the presence of an external bowl 37 forming an oil collector designed for collecting the overflow leaks associated with the penetration of the rod 32 into the cylindrical body 26. Indeed, during the maximum extraction of the rod 32, both chambers 28 and 29 separated by the plunger 27 are substantially filled with oil. When the plunger 27 lowers itself, the rod 32 engages progressively into the cylindrical body 26 and its volume creates an oil overflow which is discharged by the axial orifice 33 and which is collected by the collector 37. During the upward stroke of the plunger 27, the oil discharged comes back into the body of the jack 26 in order to replace the volume of the rod 32 undergoing extraction.

The plunger 27 is fitted with orifices 38 ensuring the connection between both chambers 28 and 29. These orifices 38 are associated with selective blank-off valves 39 arranged in the lower chamber 29 and interconnected with the plunger 27 via a ram 40. The valves 39 blank off the orifices 38 during the downward stroke of the plunger 27, thanks to the oil pressure inside the chamber 29; the downward stroke of the plunger 27 is then solely controlled by the peripheral clearance 34.

When the plunger 27 goes up, the valves 39 open and oil may flow freely from the chamber 28 into the chamber 29 via orifices 38. The motion of the plunger 27 is not controlled by the peripheral clearance 34 any longer and it has the possibility of going up more rapidly. In the embodiment represented, two valves 39 are each associated with two orifices 38. To ensure the function just described, an orifice 38 and a valve 39 may be sufficient.

On FIG. 2, we notice the presence of an inner portion 41 with larger diameter, in the lower region of the cylindrical body 26. This portion 41 extends from a transition region 42 to the bottom 30. It is adapted to increase the peripheral clearance between the plunger 27 and the cylindrical body 26 in order, in this region, to limit or suppress the controlling or dampening effect of the plunger 27. This feature will be explained further below.

The presence of ribs 43 regularly spaced over the periphery of the region 41 with larger diameter and laid-out to ensure the guiding of the plunger 27 down to the bottom 30, should be noted.

Various operating phases of the separation device, rendered safe according to the invention, are illustrated on FIGS. 1a to 1d.

FIG. 1a shows the downstream load 3 which is blocked by the end stop 7 and which actuates the pedal 8. The latter tracts the rod 15 which, itself, pulls the manoeuvring arm 14 via the stop 20. The strength exerted by the recall spring 22 is not sufficient to counter the weight of the load 3 on the pedal 8 and the hook 12 of the stop 9 is brought into active retaining position, above the raceway of the dynamic storage chute to block the second load 4 as well as those following it. The leak-type jack 25 is arranged under the stop 9 bearing against the frame of the storage chute; its rod 32 is in contact with the lower portion of the tray 13 and the plunger 27 is situated in the upper part of the cylindrical body 26.

When the downstream load 3 is extracted from the dynamic storage chute (FIG. 1b), the end pedal 8 is not subject to the former any longer. The recall spring 22 then plays its role fully in pulling the manoeuvring arm 14. The stop 9 pivots round its rotational axis 11 counterclockwise and it starts its de-actuation motion on the other hand, the arm 14 pushes the stop 20 and manoeuvres the traction rod 15 in the return direction of the pedal 8 into stand-by high position.

The leak-type jack 25 comes fully into effect as soon as contact ceases between the downstream load 3 and the pedal 8 in order to slow down or to dampen the de-actuation motion of the stop 9. The jack 25 controls the downward stroke of the stop 9 and delays the de-actuation of its end hook 12.

Indeed, the recall spring 22 exerts a traction onto the manoeuvring arm 14 which causes the tray 13 to bear against the end of the rod 32 of the jack 25 The recall spring 35 of this jack 25 possesses a strength weaker than that of the recall spring 22 and the rod 32 engages progressively the cylindrical body 26 causing a downward motion of the plunger 27. This downward stroke is controlled by the slight peripheral clearance 34 down to the transition region 42. In this downward stroke of the plunger 27, the valves 39 blank off the orifices 38; the peripheral clearance 34 is adapted to delay the de-actuation of the stop 9 according to a requested time, ranging from 5 seconds and 3 minutes, for instance.

It should be noted that the delay times after contact is lost between the downward load 3 and the pedal 8, will be affected by the variable time during which the pedal 8 is still in contact with the underside of the downward load 3, during the initial extraction phase.

When the plunger 27 reaches the transition region 42, the operating clearance 34 increases suddenly. The motion of the plunger 27 is almost not dampened any longer and the stop 9 is de-actuated rapidly. The moment when the stop 9 is de-actuated may correspond to the moment when the plunger 27 reaches the transition region 42 or to the moment when the plunger has gone slightly past that level. This feature enables to prevent the hook 12 from snapping onto the bottom of the pallet 4, which would cause, not only possible damages to the device, but also slowing down the pallet during separation.

Figure 1C:
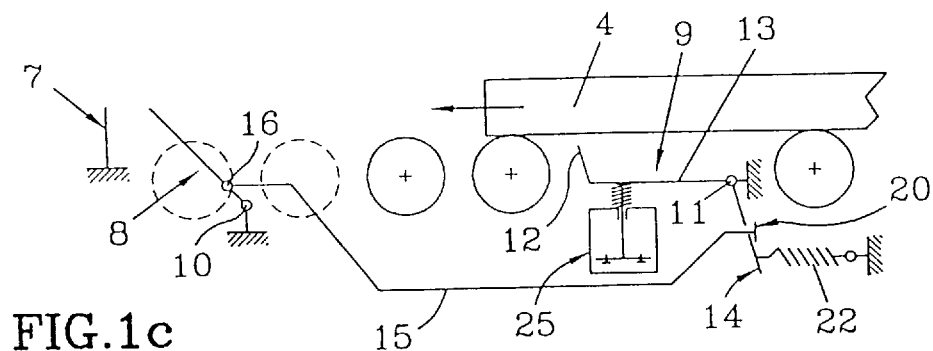

When the stop 9 is de-actuated, its end hook 12 passes under the level of the raceway of the loads (FIG. 1c). The pedal 8 is raised to its maximum and extends above the raceway of the loads, just before the end stop 7. The rod 32 and the plunger 27 of the jack 25 are in maximum low position, maintained by the pressure from the tray 13 associated with the effect of the recall spring 22. The first load 4 which was blocked by the stop 9 moves toward the end of the dynamic storage chute; the next loads can be separated from it by slowing down rollers or cylinders, judiciously arranged to limit their speeds.

Figure 1D:
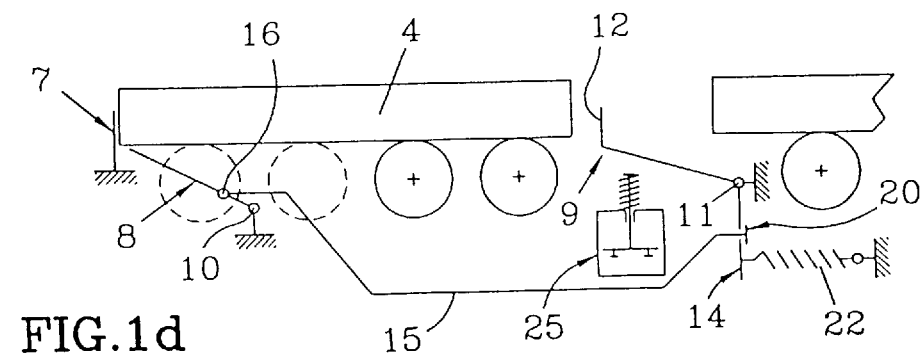

When the released load 4 arrives at the level of the end stop 7, the next load 5 has not reached the retaining stop 9 as yet (FIG. 1d). This load 4, which has become the downstream load actuates the pedal 8 which manoeuvres, in turn, the retaining stop 9 via the traction rod 15. The hook 12 is brought back above the raceway in order to block the load 5 being displaced.

The rod 32 of the jack 25 comes back progressively and by itself to its extracted stable position thanks to the recall spring 35; this upward motion is accelerated by the opening of the valves 39.

In the embodiment illustrated on the FIG. 1a to 1d, the actuation means of the retaining stop 9 (pedal 8, traction rod 15) are partially disconnected from the de-actuation means (recall spring 22) and the delay member 25 is arranged directly under the stop 9. While adhering to the same operating principle, in the installation described above or within the framework of different separation devices, the jack-like 25 delay system can be designed to co-operate with any member in motion (end pedal, connecting rod or other . . . ).

In all cases, the delay system must not interfere (or little) with the actuation of the retaining stop 9 by the pedal 8.

In the embodiment of FIGS. 3a to 3d, we have kept a load separation system substantially balanced round the rotational axis of the retaining stop to enable its actuation by any load type. The separator in question comprises, moreover, a retaining stop's locking system to render operation safer. This locking system enables to avoid the removing or the de-actuation of the stop subject to the action of a heavy load or having a sizeable kinetic energy.

As represented on FIGS. 3a to 3d, the separation device picks up partially he same elements as that illustrated on FIGS. 1a to 1d. These elements keep the same item numbers for easy reference.

Thus, we still have the dynamic storage chute with the juxtaposition of cylinders 1 and the end stop 7 to retain the downstream load.

The separation device properly speaking consists of a pedal 8 and of a mobile stop 9 linked by the tie 15. The stop 9 mounted on the articulation axis 11 is prolonged by a manoeuvring arm 14 which is subject to the action exerted by the balancing spring 22 and which is traversed by the rod 15 fitted with a stop 20 in the form of an adjustable screw.

The stop's 9 locking sub-assembly is constituted of a lever 45 controlling the motion of a toggle joint 46 interconnected with the said stop 9. The lever 45 is articulated in 47 on the frame of the chute; it is located upstream of the pedal 8, at a distance from the former smaller than the length of the loads. This lever 45 comprises a protruding section which extends above the circulation plane of the loads and which is fitted with a roller system 48.

The lever 45 controls the motion of the toggle joint 46 via a rod 50.

The toggle joint 46 is constituted of two rocker bars 51 and 52 interposed between the frame of the chute and the retaining stop 9. Both rocker bars 51 and 52 are interconnected by an articulation axis 53. The other end of the rocker bar 51 is interconnected with the stop 9 via the articulation 54 and the other end of the rocker bar 52 is interconnected with the frame of the chute using the articulation 55.

The rocker bar 51 comprises a lug-shaped extension 56 which serves as a guide for the rod 50 linked to the lever 45. The rod 50 goes through a suited orifice, arranged at the end of the lug 56 and it is fitted with an adjustable end stop 60; this link is located under the articulation 55 of the rocker bar 52 on the frame. At its other end, the rod 50 is articulated at 61 on an extension from the lever 45.

Between both its ends, the rod 50 accommodates a welded square 62. This square 62 acts as a stop for a first accumulator member 63, in the form of a spring, which is mounted on the rod 50 and whose other end bears against the lug 56. This square 62 also serves as an anchor for a second accumulator member 64 whose other end is interconnected with the frame of the chute.

The spring 63 is used for locking the toggle joint 46. In home position (toggle joint 46 de-actuated), this spring 63 is advantageously slightly compressed between the square 62 and the lug 56. The stiffness of the spring 63 may lie in the vicinity of 0.8 Newton/mm.

The spring 64 exerts a traction effect on the rod 50; it is used for unlocking the toggle joint 46 and for bringing the lever 45 back into active position. With the toggle joint de-actuated, the spring 64 can be slightly stretched. The stiffness of the spring 64 may lie in the vicinity of 1.25 Newton/mm.

Close to the control lever 45, we notice the presence of a delay jack 25 identical to that illustrated on FIG. 2. This delay 25 is fixed to the frame of the chute and its rod is in contact with a manoeuvre lug 66 interconnected with the lever 45.

The operation of the locking sub-assembly will now be illustrated in conjunction with various phases illustrated on FIGS. 3a to 3d.

Figure 3A:
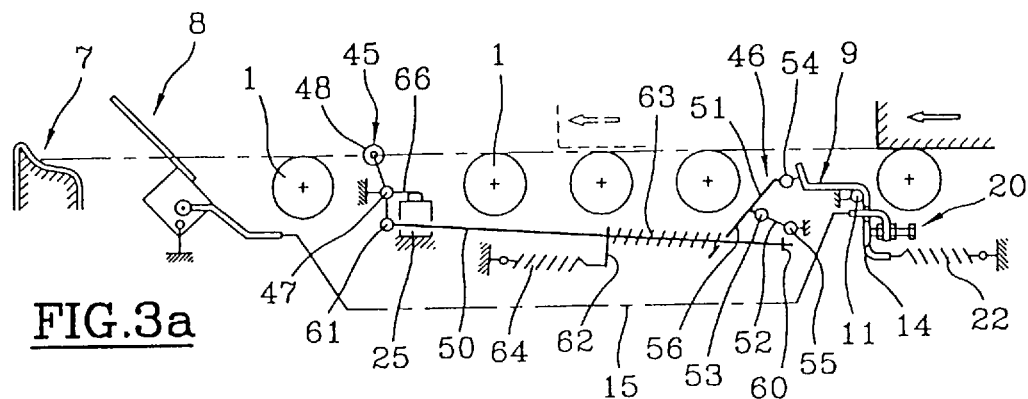
FIGS. 3a, 3b, 3c and 3d are diagrammatic representations of another possible embodiment of the separator device fitted with a locking system for the retaining stop, also illustrating different operating phases.

On FIG. 3a, the separator device and the locking sub-assembly are in inactive position. The pedal 8 and the lever 45 extend above the displacement plane of the loads. The retaining stop 9 is arranged under the displacement plane to allow the loads to move till the end of the chute.

Figure 3B:
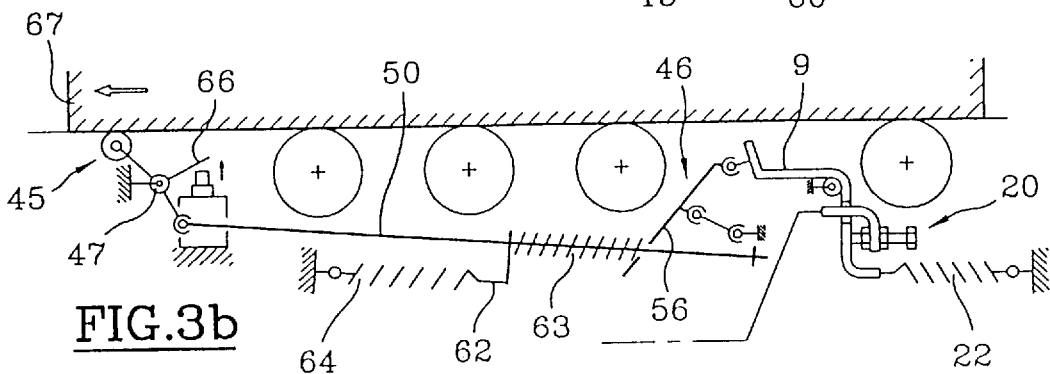
Figure 3C:
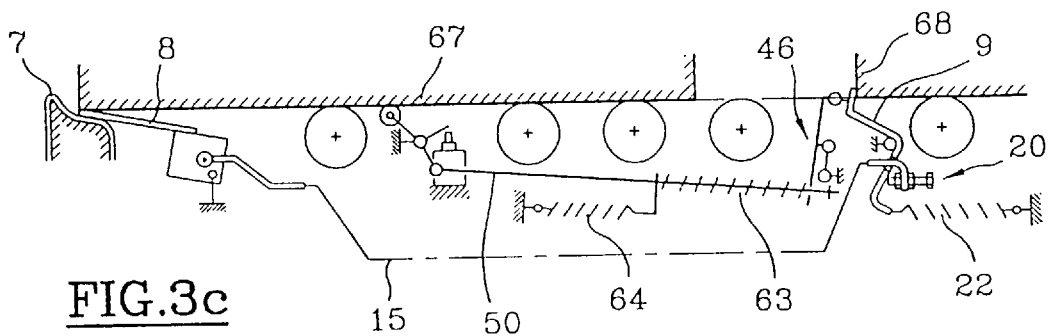
Figure 3D:
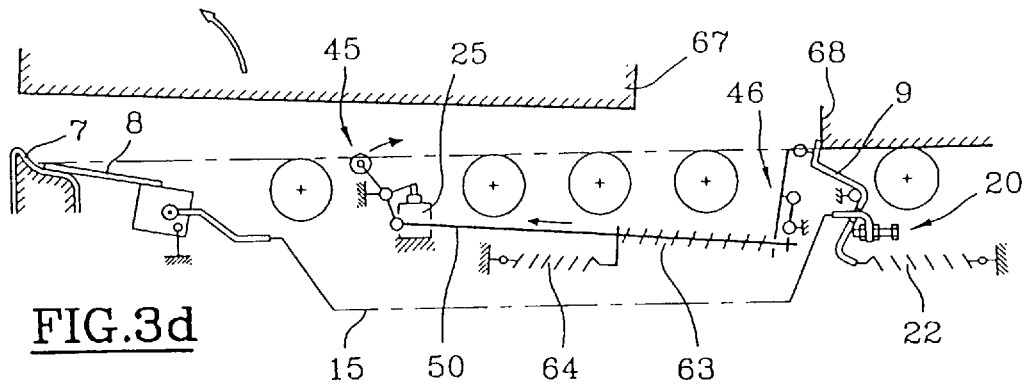

When a load 67 arrives at the level of the downstream end of the dynamic storage chute, it causes the lever 45 to retract (FIG. 3b).

The lever 45 pivots round its articulation axis 47 which causes the rod 50 to move upstream of the chute, as well as the lug 66 to rise. The motion of the rod 50 charges the energy accumulators 63 and 64, compresses the spring 63 and stretches the spring 64. The spring 63 exerts a load onto the set of rocker bars 51 and 52.

Given the current configuration of the toggle joint 46 and of the retaining stop 9, with its balancing spring 22, the thrust of the spring 63 is insufficient to actuate the lug 56 forming a lever.

Moreover, the lever 45 being in low position, the lug 66 releases the rod 32 of the delay jack 25. This rod 32 moves out from the cylindrical body 26 under the effect of the spring 35 to reach the delay start position.

The load 67 continues its travel up to the end stop 7 (FIG. 3c) at the level of which it actuates the pedal 8 to bring the retaining stop 9 into active position to block the upstream loads 68. The rising of the stop 9 is accompanied by a motion of the toggle joint 46 assisted in so doing by the spring 63, thus giving back the energy accumulated.

Both rocker bars 51 and 52 come apart to adopt a position more or less in the extension of one another, if not slightly beyond, in order to ensure efficient locking of the positioning of the stop 9. The pre-loaded spring 63 pushes against the lever arm 56 in order to assist and to complete this locking motion. As this motion is performed without any load, i.e. without any stress imposed on the stop 9, it is performed unrestricted and does not call for an excessive energy.

The toggle joint 46 locks efficiently the retaining stop 9; this locking is suited to the maximum stress liable to be applied by the juxtaposition of the various loads 68.

When the downstream load 67 is removed from the dynamic storage chute (FIG. 3d), the spring 64 exerts a traction effect on the rod 50 on the unlocking direction of the toggle joint 46. This unlocking is delayed by the action of the jack 25 which retains the motion of the lug 66. It acts at full load and it is facilitated by demultiplication of the stresses obtained thanks to the lever arm 56.

A the end of the delay, the spring 64 unlocks the toggle joint 46 completely and the retaining stop 9 is retracted by the action of the balancing spring 22. Besides, the pedal 8 and the lever 45 come back into position above the storage plane of the loads.

The new furthermost downstream load can move to the end of the chute and a new separation cycle starts again.

I claim:

1. A pallet or load separator in a dynamic storage chute, comprising:
    a dynamic storage chute having a downstream end;
    a pedal located at the downstream end of the dynamic storage chute;
    a tie connected to the pedal;
    a retaining stop connected to the tie;
    a connection between the pedal and the retaining stop, via the tie, being substantially nonelastic;
    the pedal being movable under an effect of a downstream load to move, via the tie, the retaining stop to retain an upstream load; and
    a delay device comprising a controlled leak jack having a rod having a stroke extending from a delay start position and a delay end position, the delay device being capable of maintaining the retaining stop in an active position for a sufficient time to allow removing and handling of the downstream load before arrival of the upstream load at the downstream end of the dynamic storage chute, the delay device being arranged to not interfere with actuation of the retaining stop by the pedal.

2. The separator of claim 1, wherein the rod of the controlled leak jack is biased from the delay end position to the delay start position.

3. The separator of claim 2, wherein the controlled leak jack comprises a spring biasing the rod from the delay end position to the delay start position.

4. The separator of claim 1, wherein the controlled leak jack comprises a hydraulic dampening jack including a cylindrical body, a plunger enclosed within and slidably mounted in the cylindrical body with sufficient clearance to provide peripheral oil leak to provide dampening, the rod of the controlled leak jack being connected to the plunger and protruding outside of the cylindrical body, and a recall spring associated with the plunger and rod to bias the rod into an extended position.

5. The separator of claim 4, wherein the plunger separates the cylindrical body into two chambers, the plunger comprising at least one traversing orifice associated with a selective blank-off valve capable of blanking off the at least one traversing orifice when the plunger acts as a delay member, the selective blank-off valve also being capable of opening the at least one traversing orifice during a reverse motion into a stable position.

6. The separator of claim 4, wherein the rod of the controlled leak jack extends outside of the cylindrical body via an orifice around which an oil collector is arranged, the oil collector being capable of collecting leaks or losses of oil associated with penetration of the rod in the cylindrical body.

7. The separator of claim 4, wherein the cylindrical body of the controlled leak jack comprises an inner portion having a larger diameter at a level corresponding to an end in a stroke of the plunger to increase the clearance between the cylindrical body and the plunger.

8. The separator of claim 1, wherein the controlled leak jack is arranged directly under the retaining stop.

9. The separator of claim 8, wherein the dynamic storage chute comprises a frame, and wherein the controlled leak jack bears against the frame of the dynamic storage chute.

10. The separator of claim 1, wherein the retaining stop is rotatably mounted on an articulation axis and subject to a balancing system which tends to bring the pedal into a raised position and to put the retaining stop in an inactive position, the balancing system comprising a maneuvering arm rotatably mounted on the articulation axis of the retaining stop and connected to the retaining stop, a balancing spring biasing the maneuvering arm such that the retaining stop is in an inactive position, and the tie connected to the pedal being capable of moving the maneuvering arm such that the retaining stop is in an active position.

11. The separator of claim 1, further comprising a locking system capable of locking the retaining stop in the active position to retain loads, the locking system comprising a lever situated at a distance upstream of the pedal which is less than a length of loads, the lever including a portion protruding above a circulation plane of the loads in a home position, the lever being retractable upon passage of a load which causes:
 a first spring to be pre-loaded so that the pre-loading may be used to lock the retaining stop when activated by the pedal, and a second spring to be pre-loaded so that the pre-loading may be used to unlock the retaining stop and to return the lever to the home position.

12. The separator of claim 11, wherein the dynamic storage chute comprises a frame, and wherein the locking system comprises a toggle joint comprising a frame rocker bar and a stop rocker bar with both rocker bars being between the frame of the dynamic storage chute and the retaining stop, the stop rocker bar having a lug extension extending beneath an articulation of the frame rocker bar, the lug extension serving as a guide at the end of a rod on which is arranged the first spring, the rod being recalled by the second spring which is anchored on the frame of the dynamic storage chute.

13. The separator of claim 11, wherein the dynamic storage chute comprises a frame, and farther comprising a delay jack between the frame of the dynamic storage chute and the lever of the locking system, the delay jack being capable of delaying unlocking of the retaining stop.

14. A pallet or load separator in a dynamic storage chute, comprising:
 a dynamic storage chute having a downstream end;
 a pedal located at the downstream end of the dynamic storage chute;
 a tie connected to the pedal;
 a retaining stop connected to the tie;
 the pedal being movable under an effect of a downstream load to move, via the tie, the retaining stop to retain an upstream load; and
 a delay device comprising a controlled leak, hydraulic dampening jack having a rod having a stroke extending from a delay start position and a delay end position, the delay device being capable of maintaining the retaining stop in an active position for a sufficient time to allow removing and handling of the downstream load before arrival of the upstream load at the downstream end of the dynamic storage chute, the delay device being arranged to not interfere with actuation of the retaining stop by the pedal, wherein the hydraulic dampening jack includes a cylindrical body, a plunger enclosed within and slidably mounted in the cylindrical body with sufficient clearance to provide peripheral oil leak to provide dampening, the rod of the controlled leak jack being connected to the plunger and protruding outside of the cylindrical body, and a recall spring associated with the plunger and rod to bias the rod into an extended position.

15. The separator of claim 14, wherein the plunger separates the cylindrical body into two chambers, the plunger comprising at least one traversing orifice associated with a selective blank-off valve capable of blanking off the at least one traversing orifice when the plunger acts as a delay member, the selective blank-off valve also being capable of opening the at least one traversing orifice during a reverse motion into a stable position.

16. The separator of claim 14, wherein the rod of the controlled leak jack extends outside of the cylindrical body via an orifice around which an oil collector is arranged, the oil collector being capable of collecting leaks or losses of oil associated with penetration of the rod in the cylindrical body.

17. The separator of claim 14, wherein the cylindrical body of the controlled leak jack comprises an inner portion having a larger diameter at a level corresponding to an end in a stroke of the plunger to increase the clearance between the cylindrical body and the plunger.

18. A pallet or load separator in a dynamic storage chute, comprising:
 a dynamic storage chute having a downstream end;
 a pedal located at the downstream end of the dynamic storage chute;
 a tie connected to the pedal;
 a retaining stop connected to the tie;

the pedal being movable under an effect of a downstream load to move, via the tie, the retaining stop to retain an upstream load;

a delay device comprising a controlled leak jack having a rod having a stroke extending from a delay start position and a delay end position, the delay device being capable of maintaining the retaining stop in an active position for a sufficient time to allow removing and handling of the downstream load before arrival of the upstream load at the downstream end of the dynamic storage chute, the delay device being arranged to not interfere with actuation of the retaining stop by the pedal; and a locking system capable of locking the retaining stop in the active position to retain loads, the locking system comprising a lever situated at a distance upstream of the pedal which is less than a length of loads, the lever including a portion protruding above a circulation plane of the loads in a home position, the lever being retractable upon passage of a load which causes:

a first spring to be pre-loaded so that the pre-loading may be used to lock the retaining stop when activated by the pedal, and a second spring to be pre-loaded so that the pre-loading may be used to unlock the retaining stop and to return the lever to the home position.

19. The separator of claim 18, wherein the dynamic storage chute comprises a frame, and wherein the locking system comprises a toggle joint comprising a frame rocker bar and a stop rocker bar with both rocker bars being between the frame of the dynamic storage chute and the retaining stop, the stop rocker bar having a lug extension extending beneath an articulation of the frame rocker bar, the lug extension serving as a guide at the end of a rod on which is arranged the first spring, the rod being recalled by the second spring which is anchored on the frame of the dynamic storage chute.

20. The separator of claim 18, wherein the dynamic storage chute comprises a frame, and further comprising a delay jack between the frame of the dynamic storage chute and the lever of the locking system, the delay jack being capable of delaying unlocking of the retaining stop.

* * * * *